United States Patent [19]

D'Amico et al.

[11] Patent Number: 5,077,790
[45] Date of Patent: Dec. 31, 1991

[54] SECURE OVER-THE-AIR REGISTRATION OF CORDLESS TELEPHONES

[75] Inventors: Thomas V. D'Amico, Baco Raton; Ronald E. Sharp, Plantation, both of Fla.

[73] Assignee: Motorola, Inc., Schaumburg, Ill.

[21] Appl. No.: 635,405

[22] Filed: Dec. 31, 1990

Related U.S. Application Data

[63] Continuation of Ser. No. 562,356, Aug. 3, 1990, abandoned.

[51] Int. Cl.$^5$ ............... H04K 1/00; H04M 11/00
[52] U.S. Cl. .............................. 380/23; 379/62
[58] Field of Search ........................ 379/62; 380/23

[56] References Cited

U.S. PATENT DOCUMENTS

| | | | |
|---|---|---|---|
| 4,560,832 | 12/1985 | Bond et al. | 380/33 |
| 4,574,163 | 3/1986 | Zato | 380/23 |
| 4,646,345 | 2/1987 | Zdunek et al. | 379/62 |
| 4,654,481 | 3/1987 | Corris et al. | 380/23 |
| 4,682,351 | 7/1987 | Makino | 379/62 |
| 4,736,404 | 4/1988 | Anglikowski et al. | 379/62 |
| 4,776,000 | 10/1988 | Parienti | 379/62 |
| 4,796,291 | 1/1989 | Makino | 379/62 |
| 4,801,935 | 1/1989 | Cairns | 379/62 |
| 4,802,201 | 1/1989 | Yoshizawa et al. | 379/62 |
| 4,811,377 | 3/1989 | Krolopp et al. | 380/23 |

FOREIGN PATENT DOCUMENTS

| | | | |
|---|---|---|---|
| 0344989 | 12/1989 | European Pat. Off. | 379/62 |
| 3402467 | 8/1985 | Fed. Rep. of Germany | 379/62 |
| 62-278870 | 5/1986 | Japan | 379/62 |

*Primary Examiner*—Thomas H. Tarcza
*Assistant Examiner*—David Cain
*Attorney, Agent, or Firm*—Michael J. Buchenhorner

[57] ABSTRACT

A method for registration of a portable unit that may be utilized in a communication system that comprises a network controller, having a data base for storing portable identification numbers, a base station, and a portable unit, wherein a subscriber communicates to the network controller a first information set which comprises subscriber qualifying information, the portable identification number, and a key code that has been entered into the portable, and wherein the subscriber has entered a link identification number for over-the-air registration into a memory within the portable unit. The registration method comprises the following steps. The portable unit sends the base station a request for registration. The request for registration comprises the link identification number for over-the-air registration and the portable identification number. The base station receives the request for registration from the portable unit, and sends to the network controller a notice of the request for registration and the portable identification number. The network controller receives the notice of the request for registration from the base station, and determines whether the portable identification number is in the network controller data base, and whether the subscriber has been approved for registration. The network controller then sends to the portable unit, through the base station, a registration information signal if the network controller determines that the portable identification number for over-the-air registration is in the network controller data base, and that the subscriber has been approved for registration, the registration information signal comprising an encrypted secret subscriber identification number that has been encrypted with the key code, and an unencrypted link identification number for base station access.

10 Claims, 6 Drawing Sheets

SECURE OVER-THE-AIR REGISTRATION OF CORDLESS TELEPHONES

This is a continuation of application Ser. No. 07/562,356 filed Aug. 3, 1990 and now abandoned.

TECHNICAL FIELD

This invention relates generally to public cordless telephone systems.

BACKGROUND

Cordless telephone communication systems generally comprise a plurality of public base stations (also called telepoints) that may be used by any subscribers within range. In the future such public base stations may become as common as public telephones are today. When in range, a subscriber will be able to access the public switched telephone network (PSTN) and place a call. However, registration of a cordless handset into a cordless telephone system presents some problems. There is an expected delay from the time that a customer buys a cordless handset (also known as a portable communication unit, or simply a portable unit) until the customer receives access to the cordless telephone system from the network operator. This delay is generally used for checking the subscriber's credentials such as available credit or other qualifying information. Since the portables store all registration data, there is a need to load this data at a convenient time and location after the credit check is completed. In cellular systems on-line validation is used where a portable may be activated instantly at a central data base.

The generation, delivery, and loading of the registration data is an arduous task. For, example, CT-2 requires the manual entry of up to 67 characters (including all check digits). Reduction or elimination of this manual entry is highly desirable.

SUMMARY OF THE INVENTION

Briefly, according to the invention, a method for registration of a portable unit may be utilized in a communication system that comprises a network controller, having a data base for storing portable identification numbers, a base station, and a portable unit, wherein a subscriber communicates to the network controller a first information set which comprises subscriber qualifying information, the portable identification number, and a key code that has been entered into the potable, and wherein the subscriber has entered a link identification number for over-the-air registration into a memory within the portable unit. The registration method comprises the following steps. The portable unit sends the base station a request for registration. The request for registration comprises the link identification number for over-the-air registration and the portable identification number. The base station receives the request for registration from the portable unit, and sends to the network controller a notice of the request for registration and the portable identification number. The network controller receives the notice of the request for registration from the base station, and determines whether the portable identification number is in the network controller data base, and whether the subscriber has been approved for registration. The network controller then sends to the portable unit, through the base station, a registration information signal if the network controller determines that the portable identification number for over-the-air registration is in the network controller data base, and that the subscriber has been approved for registration. The registration information signal comprises an encrypted subscriber identification number that has been encrypted with the key code, and an unencrypted link identification number for base station access.

DETAILED DESCRIPTION OF THE PREFERRED EMBODIMENT

Figure 1:
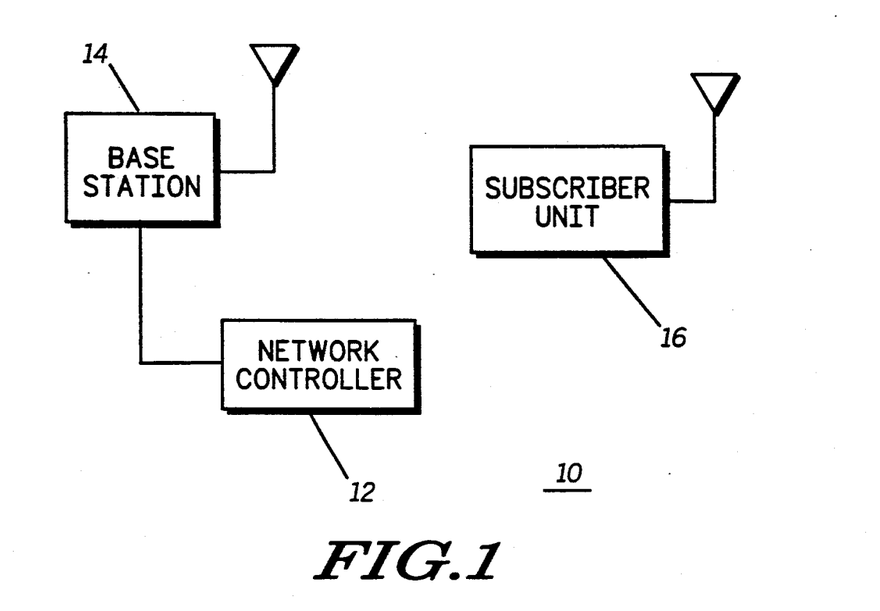
FIG. 1 shows a communication system in which the invention may be advantageously utilized.

Referring to FIG. 1, a communication system 10 in which the invention may be advantageously utilized is shown. The system 10 comprises a network controller 12, a base station 14, and a portable unit 16.

Figure 2:
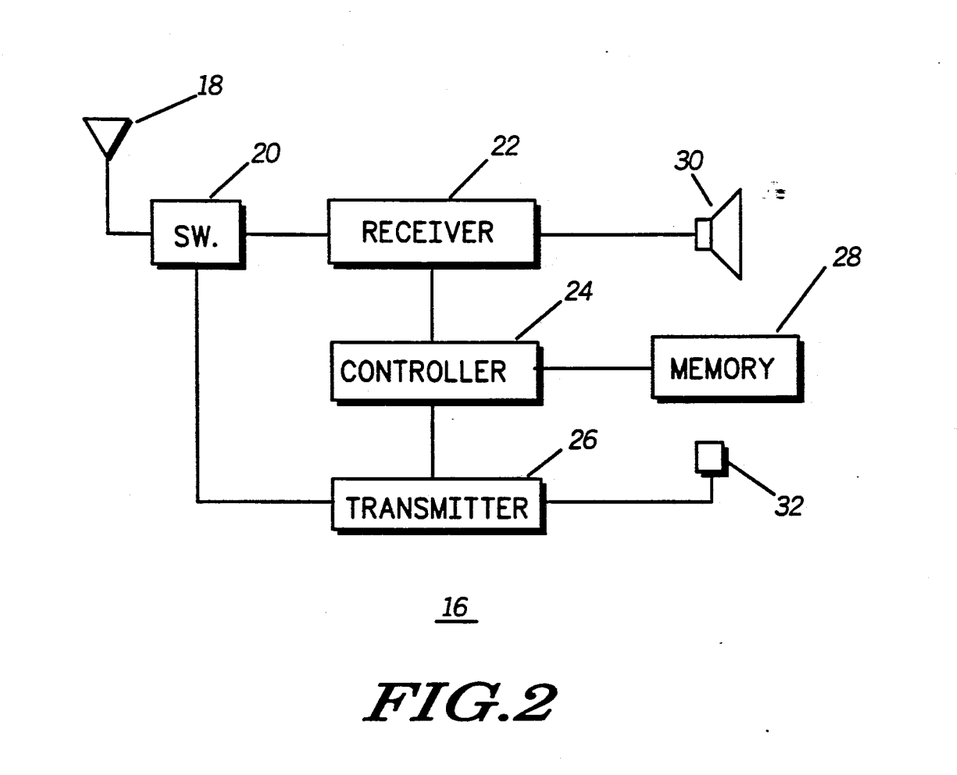
FIG. 2 shows a portable unit that may be adapted for use in accordance with the invention.

Referring to FIG. 2, there is shown a portable unit 16 that may be adapted for use in accordance with the invention. The portable unit 16 comprises an antenna 18, a transmit/receive switch 20, a radio-frequency receiver 22, a radio-frequency transmitter 26, a controller 24 (e.g., a conventional microcomputer), a memory 28 (e.g., a read only memory and/or a random access memory), a speaker 30, and a microphone 32 all coupled as shown in the FIG. 1. The portable unit 16 may be adapted to operate in accordance with the invention by programing the controller 24 to use the portable unit registration and re-registration processes of the invention.

Figure 3:
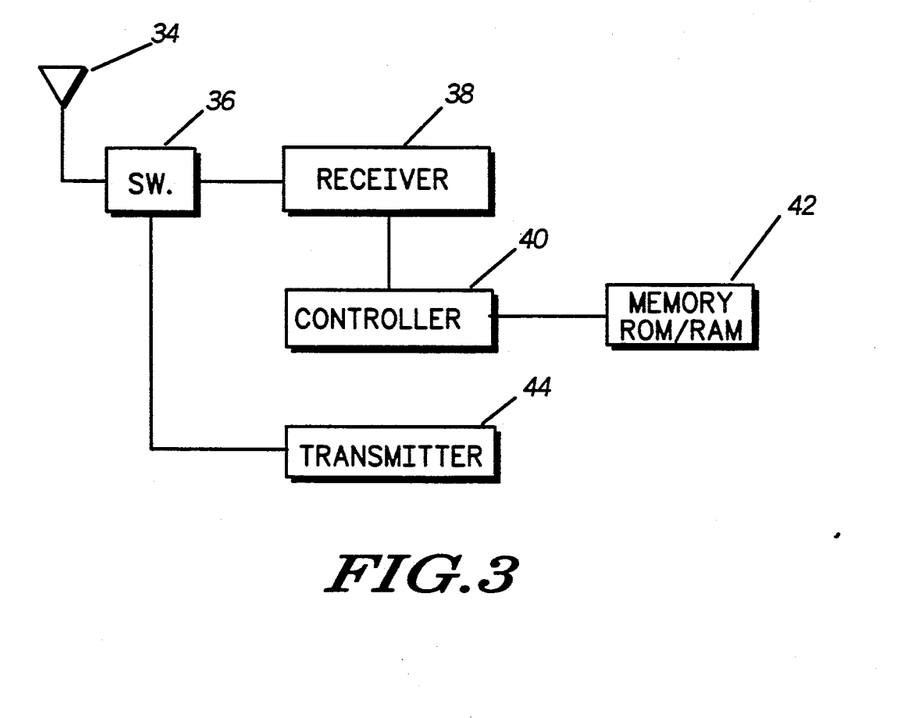
FIG. 3 shows a base station that may be adapted for use in accordance with the invention.

Referring to FIG. 3, there is shown a base station 14 that may be adapted for use in accordance with the invention. The base station 14 comprises an antenna 34, a transmit/receive switch 36, a radio-frequency receiver 38, a radio-frequency transmitter 44, a controller 40 (e.g., a conventional microcomputer), a memory 42 (e.g., a read only memory and/or a random access memory), all coupled as shown in the FIG. 2.

Figure 4A:
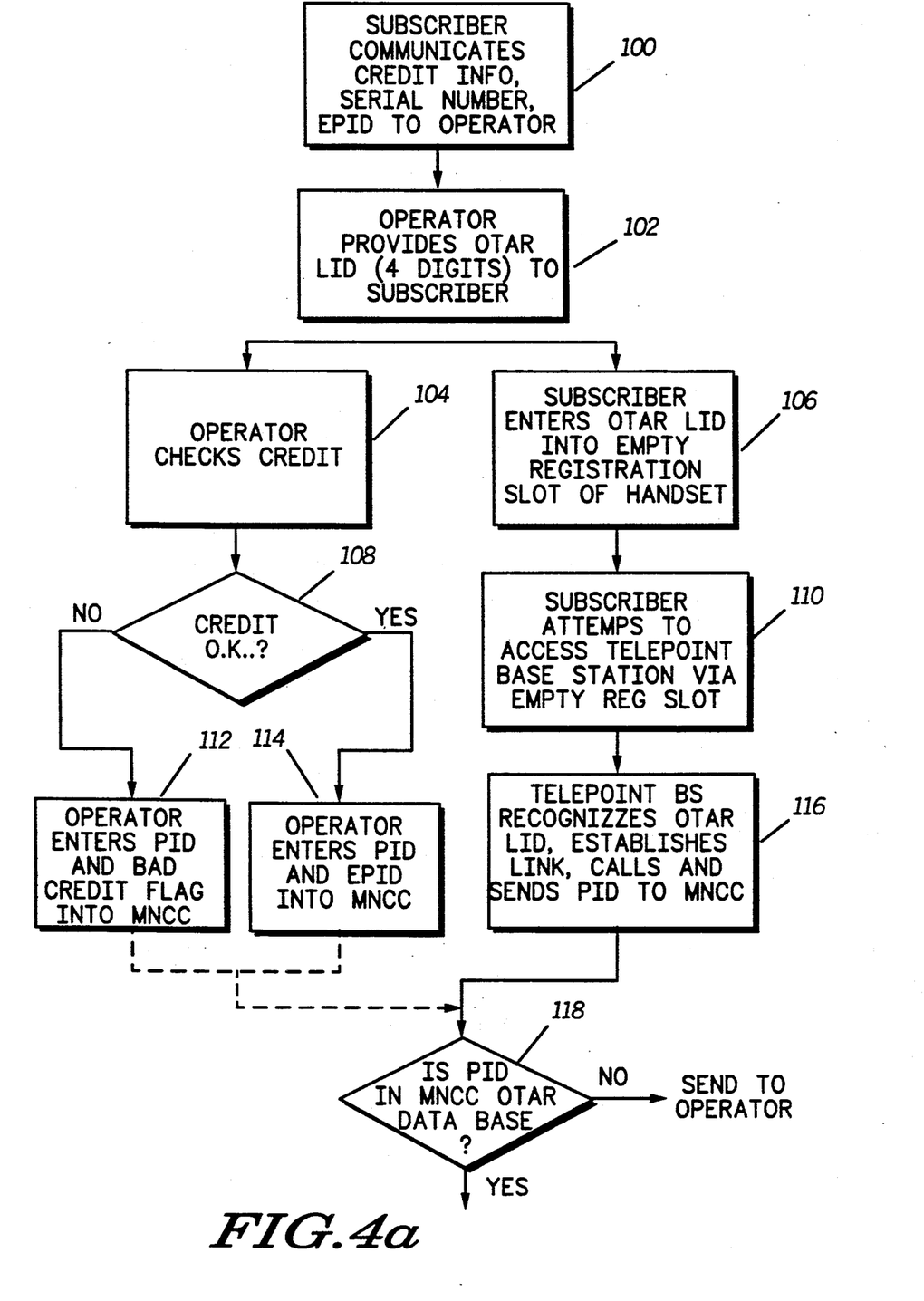
FIGS. 4a and 4b, show a simplified block diagram of a portable unit registration process in accordance with the invention.

Referring to FIG. 4a, there is shown a simplified block diagram of a portable unit registration process in accordance with the invention. In a preferred embodiment, a key code is loaded into the portable unit during manufacture, and printed in a sealed envelope. The subscriber then only needs to read the key code to the network operator (possibly during a wireless telephone conversation). Manual entry of a key code may be used as a back-up method in case that (1) the subscriber loses the envelope, or (2) the registration slot has previously been used and the network operator changed the key code. The registration process may begin at the time that a person buys a portable 16, and the portable unit dealer (or the customer) loads a key code in the portable unit 16. The secret key code may also be generated by a network operator along with a check character to maximize correct entry of the key code. Alternately, the portable unit dealer could generate the key code, provided that a high degree of randomness is assured, and a check digit or other known means is used to minimize entry errors. A network operator receives all customer credential data (in this example these data relate to the subscriber's credit), and the secret key code (if the key code is dealer-generated).

According to step 100 a subscriber, seeking registration in the communication system, communicates his or her qualifying credentials (e.g., credit information) to the network controller. The communicated information may comprise a portable unit serial number, and a secret key code that is used to encrypt and decrypt secure registration data. In step 102, the network operator provides a link identification number to the subscriber. The link identification number comprises four digits and is used for specific telepoint access. In step 104, the network operator (and the network controller) determine whether the credit information provided by the subscriber complies with a set of criteria used for qualifying the subscriber (in this example: whether the subscriber's credit is adequate). In decision 108, if the credit information of the subscriber complies with the qualifying criteria, the network operator enters a portable identification number, and a 64 bit secret key code into the network control center (which is preferably within the network controller). If the credit information relating to the subscriber does not comply with the qualifying criteria of step 112, the operator enters the portable identification number, and an invalid flag into the network control center.

According to step 110, the subscriber attempts to access a telepoint base station via a registration slot having the link identification number. Then according to step 116, the telepoint base station recognizes the over-the-air link identification number, establishes a communication link, and calls and sends the portable identification number to the network control center. In decision 118, the network controller determines whether the portable identification number is in the network controller center over the air database. If it is not, then the portable identification number is sent to the operator and the network controller.

Figure 4B:
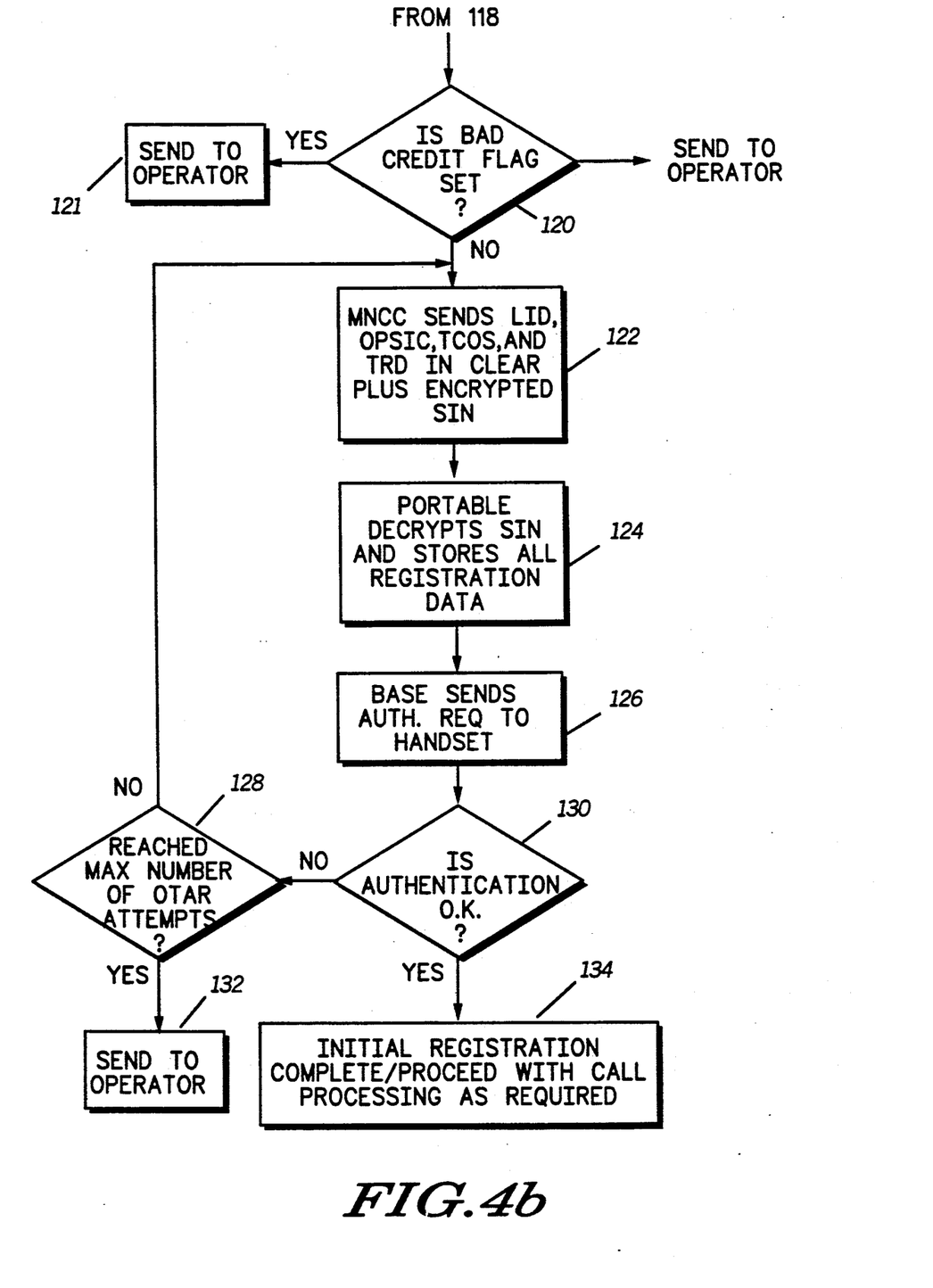

Referring to FIG. 4b, if the network controller determines that the portable identification number is in the database, then a further decision 120 is made relating to whether there is a valid/invalid flag set. If there is a invalid flag set, that information is sent to the operator, and the network controller. If a valid flag is found, the network controller sends the link identification number, the nine-bit operator's identification code number, the three-bit telepoint class of service number, and the 20 bit digit telepoint registration data field to the portable unit in unencrypted form. In addition, the network controller sends the portable an encrypted subscriber identification number that has been encrypted with the key code for that portable unit. Next, in step 124 the portable unit decrypts the subscriber identification number, and stores all registration data in its memory. In step 126, the base station sends an authentication request to the portable unit. Once the portable unit receives the authentication request and responds thereto, the base station makes a decision 130 on whether the received authentication response signal is valid. If the authentication response signal is valid the initial registration is completed in step 134 and call-processing may proceed, as required. On the other hand, if the authentication response signal is not valid, then a decision 128 must be made on whether a maximum number of over-the-air registration attempts has been made. If the maximum number of over-the-air attempts is reached, then step 132 requires that the operator in the network controller be so notified. If the maximum number of over-the-air attempts has not been reached, then the process returns to step 122.

A registration method similar to the above-discussed method allows for immediate registration. The steps are as follows. The subscriber locates a base station and attempts to register. The base station recognizes the registration attempt, and contacts the network controller which checks its data base for a valid flag. If the valid flag is not found, the subscriber is connected to a network operator "help desk." Alternatively, the subscriber could manually place a free call to the network operator "help desk." No registration would be required for this kind of call.

Upon receipt of a credit card charge number or other credit approval, the network operator "help desk," provides the subscriber with a key code and a check character to enter with a keypad. Simultaneously or immediately thereafter, the network controller receives the portable identification number from the base station and downloads the key code and all registration data to that base station. The subscriber may then register over the air in a secure data mode as in the above-described method.

Figure 5A:
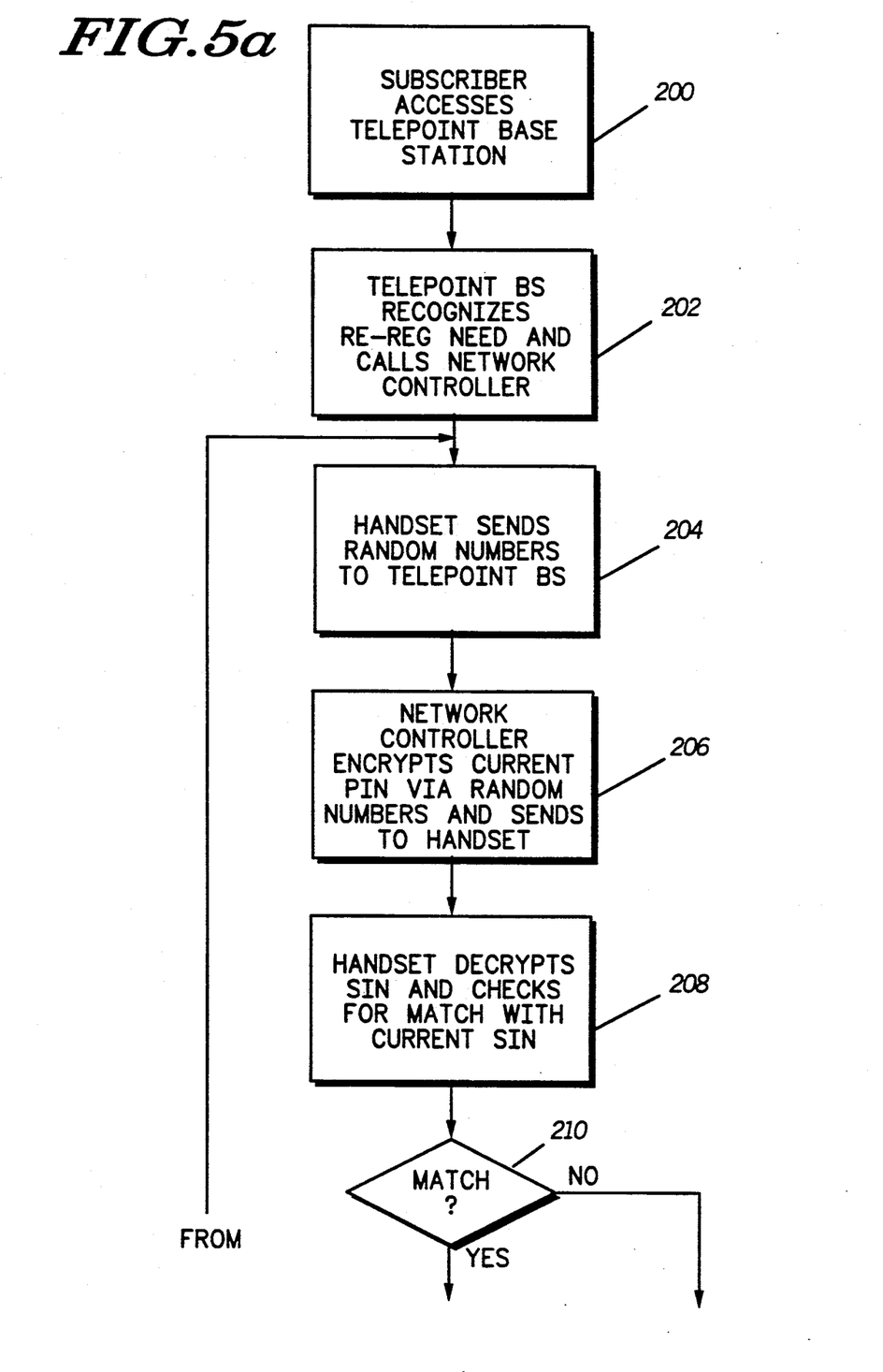
FIGS. 5a and 5b show a method for re-registration of a subscriber unit.

Referring to FIG. 5a, there is shown a method for re-registration of a subscriber unit. In step 200 a registered subscriber accesses a telepoint base station. Then according to step 202, the telepoint base station accessed by the subscriber recognizes a re-registration need, possibly due to a compromise of the authentication or registration algorithm stored in the portable. Then the telepoint base station calls the network controller, and informs it of this fact. In step 204 the portable unit sends a set of random numbers to the telepoint base station. The base station then receives and retransmits the random numbers to the network controller which, in step 206, encrypts the current subscriber identification number with the random numbers and sends that resulting encrypted subscriber identification number to the portable unit. In step 208, the portable unit decrypts the received encrypted subscriber identification number, and checks for a match with a current subscriber identification number.

Figure 5B:
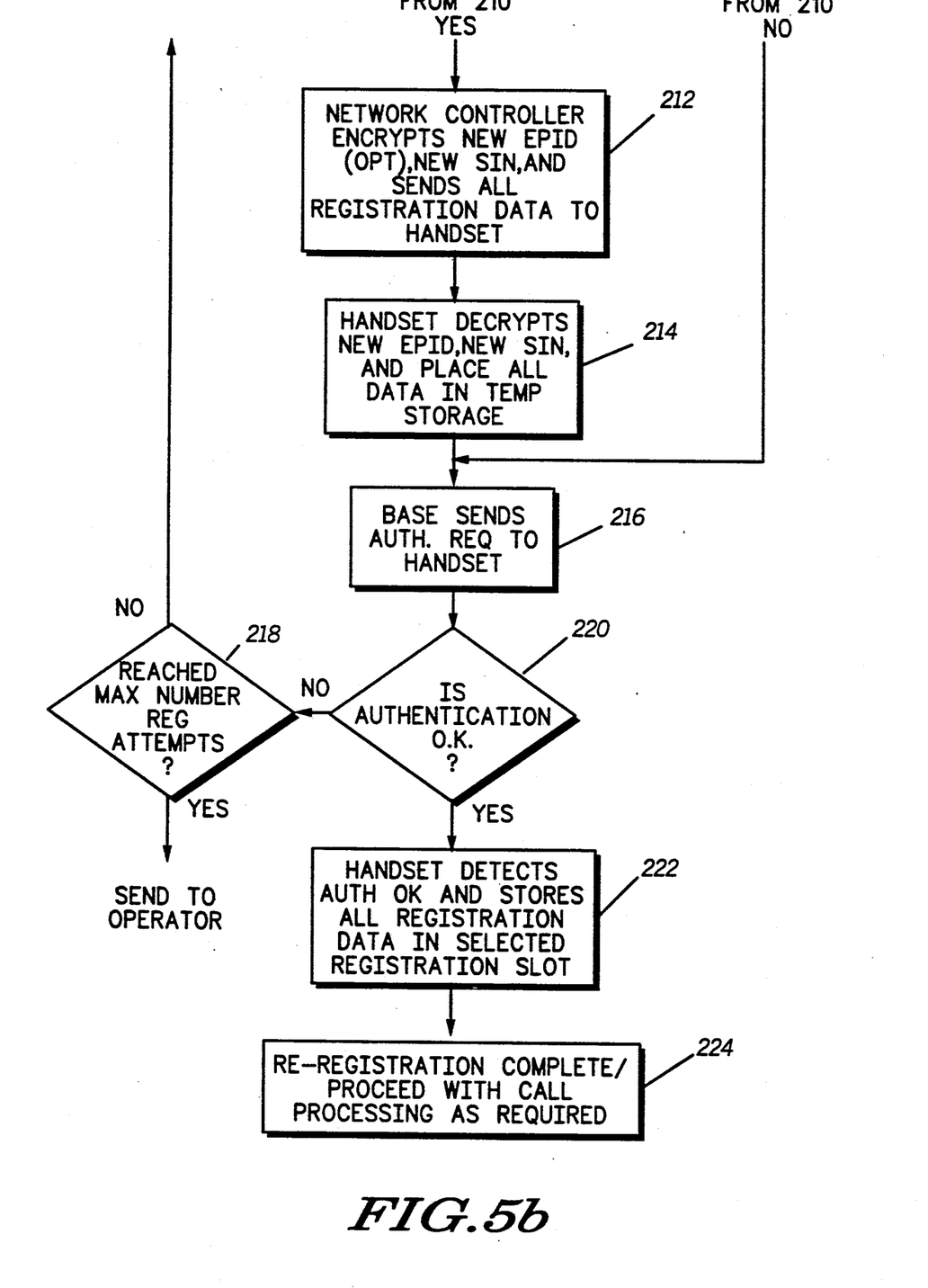

Referring to FIG. 5b, if (in decision 210) a match is determined to exist (shown in FIG. 5a), the portable unit will act upon subsequently received registration data. Then in step 212, the network controller encrypts a new secret key code and new subscriber identification number, and sends all registration data to the portable unit. Then in step 214, the portable unit decrypts the new secret key code, the new subscriber identification number, and places all that data in a temporary storage portion of the handset memory. Next in step 216 the base station sends an authentication request to the portable unit. The portable unit receives the authentication request, and responds thereto. The base station then makes a decision 220 on whether the authentication response is valid. If it is not valid, then a decision 218 is made on whether a maximum number of registration attempts has been reached. If the maximum number of registration attempts has been reached, the operator is notified in step 219. On the other hand, if the maximum number of registration attempts has not been reached, the process returns to step 204. In the event that the authentication response is valid, in step 222 the portable unit detects, the authentication response and stores all registration data in a selected registration slot in the portable unit memory. In step 223, re-registration is completed, and call-processing proceeds, as required.

The base station and the network controller perform the basic infrastructure functions. While in the preferred embodiment infrastructure functions have been specifically allocated among the base station and the network controller, those functions may be interchanged between them.

What is claimed is:

1. In a communication system comprising a network controller, having a data base for storing portable identification numbers, a base station, and a portable unit, wherein a subscriber communicates to the network controller a first information set which comprises subscriber qualifying information, the portable identification number, and a key code that has been entered into the portable, and wherein the subscriber has entered a link identification number for over-the-air registration into a memory within the portable unit, a method for registration of the portable unit, comprising the steps of:

at the portable unit:
(a) sending the base station a request for registration, the request for registration comprising the link identification number for over-the-air registration and the portable identification number;

at the base station:
(a) receiving the request for registration from the portable unit, and sending to the network controller a notice of the request for registration and the portable identification number;

at the network controller:
(a) receiving the notice of the request for registration from the base station, and determining whether the portable identification number is in the network controller data base, and whether the subscriber has been approved for registration;
(b) sending, to the portable unit through the base station, a registration information signal when the network controller determines that the portable identification number for over-the-air registration is in the network controller data base, and that the subscriber has been approved for registration, the registration information signal comprising an encrypted subscriber identification number that has been encrypted with the key code, and an unencrypted link identification number for base station access.

2. The method for registration of the portable unit of claim 1, further comprising the steps of:

at the portable unit:
(b) receiving the registration information signal sent by the network controller, decrypting the encrypted subscriber identification number, and placing the information in the registration information signal in temporary storage;
(c) receiving the authentication request from the base station;
(d) sending an authentication response to the base station;
(e) receiving the notification signal from the base station and maintaining the information in the registration information signal in long term storage;

at the base station:
(b) sending an authentication request to the portable unit;

(c) receiving the authentication response from the portable unit, determining whether the authentication response is valid, and sending a notification signal to the portable unit when the authentication response is valid.

3. The method for registration of the portable unit of claim 2, further comprising the step of:

at the network controller:
(a 1) encrypting the subscriber identification number.

4. The method for registration of the portable unit of claim 2, further comprising the step of:

at the base station:
(a 1) encrypting the subscriber identification number.

5. In a communication system comprising a network controller, having a data base for storing portable identification numbers, a base station, and a portable unit, wherein a subscriber communicates to the network controller a first information set which comprises subscriber qualifying information, the portable identification number, and a key code that has been entered into the portable, and wherein the subscriber has entered a link identification number for over-the-air registration into a memory within the portable unit, and wherein the portable unit has been registered in the communication system, a method for re-registration of the portable unit, comprising the steps of:

at the base station:
(a) recognizing the need for re-registration of the portable unit, and transmitting a notification of the need for re-registration to the network controller;
(b) sending an authentication request to the portable unit;
(c) receiving the set of random numbers from the portable unit and sending the set of random numbers to the network controller;

at the network controller:
(a) receiving the notification of the need for re-registration;
(b) receiving the set of random numbers from the base station, encrypting the current subscriber identification number with the set of random numbers; and sending the encrypted subscriber identification number to the portable unit through the base station;

at the portable unit:
(a) receiving the authentication request from the base station;
(b) sending a set of random numbers to the base station;
(c) receiving the encrypted subscriber identification number, decrypting the encrypted subscriber identification number, determining whether the resulting decrypted subscriber identification number matches the current subscriber identification number, and when the resulting decrypted subscriber identification number matches the current subscriber identification number responding to any re-registration data subsequently sent by the base station.

6. The method for re-registration of the portable unit of claim 5, further comprising the steps of:

at the portable unit:
(d) decrypting the new subscriber identification number, and storing the decrypted new subscriber identification number;

at the network controller:
- (c) encrypting a new subscriber identification number and sending the new subscriber identification number to the portable unit, through the base station, when the decrypted subscriber identification number sent by the portable unit matches the current subscriber identification number.

7. The method for re-registration of the portable unit of claim 6, further comprising the steps of:
at the base station:
- (d) sending an authentication request to the portable unit;
- (e) receiving the authentication response from the portable unit, determining whether the authentication signal is valid, and sending a notification signal to the portable when the authentication response is valid;

at the portable unit:
- (e) receiving the authentication request, and sending an authentication response to the base station.

8. The method for re-registration of the portable unit of claim 7, further comprising the steps of:
at the network controller:
- (d) encrypting a new key code and sending the new key code to the portable.

9. The method for re-registration of the portable unit of claim 8, further comprising the steps of:
at the network controller:
encrypting any new subscriber identification numbers to be sent to the portable unit when a new key code, is to be sent.

10. In a communication system comprising a network controller, having a data base for storing portable identification numbers, and a base station, wherein a subscriber communicates to the network controller a first information set which comprises subscriber qualifying information, the portable identification number, and a key code, a portable unit comprising:
means for sending the base station a request for registration, the request for registration comprising a link identification number for over-the-air registration and the portable identification number;
means for receiving registration information signal sent by the network controller; and
means for decrypting an encrypted subscriber identification number.

* * * * *